(12) United States Patent
Struik

(10) Patent No.: US 8,578,165 B2
(45) Date of Patent: *Nov. 5, 2013

(54) KEY AGREEMENT AND TRANSPORT PROTOCOL

(75) Inventor: Marinus Struik, Toronto (CA)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,267

(22) Filed: Feb. 1, 2012

(65) Prior Publication Data

US 2012/0137133 A1 May 31, 2012

Related U.S. Application Data

(63) Continuation of application No. 11/961,779, filed on Dec. 20, 2007, now Pat. No. 8,209,533, which is a continuation of application No. 10/440,486, filed on May 16, 2003, now Pat. No. 7,334,127, which is a continuation-in-part of application No. PCT/CA03/00317, filed on Mar. 7, 2003, and a continuation-in-part of application No. 10/092,972, filed on Mar. 8, 2002, now Pat. No. 7,243,232, which is a continuation-in-part of application No. 08/426,090, filed on Apr. 21, 1995, now Pat. No. 6,487,661.

(51) Int. Cl.
*H04L 9/32* (2006.01)

(52) U.S. Cl.
USPC .......................................................... 713/171

(58) Field of Classification Search
USPC ................. 713/168, 169, 171, 176, 180, 181; 380/30, 259, 262, 282, 283
See application file for complete search history.

(56) References Cited

U.S. PATENT DOCUMENTS

| | | | |
|---|---|---|---|
| 4,200,770 A | 4/1980 | Hellman et al. |
| 4,405,829 A | 9/1983 | Rivest et al. |
| 4,956,863 A | 9/1990 | Goss |
| 4,991,210 A | 2/1991 | Chaum |
| 4,996,711 A | 2/1991 | Chaum |
| 5,199,070 A | 3/1993 | Matsuzaki et al. |
| 5,299,262 A | 3/1994 | Brickell et al. |
| 5,299,263 A | 3/1994 | Beller et al. |
| 5,347,581 A | 9/1994 | Naccache et al. |

(Continued)

FOREIGN PATENT DOCUMENTS

| | | |
|---|---|---|
| DE | 3915262 A | 11/1989 |
| EP | 0393806 A2 | 10/1990 |

(Continued)

OTHER PUBLICATIONS

Japanese Office Action dated Feb. 29, 2012 in Japanese Patent Application No. 2009-193282 (with English Translation).

(Continued)

*Primary Examiner* — Beemnet Dada
(74) *Attorney, Agent, or Firm* — Oblon, Spivak, McClelland, Maier & Neustadt, L.L.P.

(57) ABSTRACT

A key establishment protocol includes the generation of a value of cryptographic function, typically a hash, of a session key and public information. This value is transferred between correspondents together with the information necessary to generate the session key. Provided the session key has not been compromised, the value of the cryptographic function will be the same at each of the correspondents. The value of the cryptographic function cannot be compromised or modified without access to the session key.

14 Claims, 8 Drawing Sheets

(56) References Cited

U.S. PATENT DOCUMENTS

| | | | |
|---|---|---|---|
| 5,406,628 | A | 4/1995 | Beller et al. |
| 5,442,707 | A | 8/1995 | Miyajo et al. |
| 5,491,749 | A | 2/1996 | Rogaway |
| 5,586,186 | A | 12/1996 | Yuval et al. |
| 5,600,725 | A | 2/1997 | Rueppel et al. |
| 5,661,806 | A | 8/1997 | Nevoux et al. |
| 5,761,305 | A | 6/1998 | Vanstone et al. |
| 5,889,865 | A | 3/1999 | Vanstone et al. |
| 5,896,455 | A | 4/1999 | Vanstone et al. |
| 6,122,736 | A | 9/2000 | Vanstone et al. |
| 6,487,661 | B2 | 11/2002 | Vanstone et al. |
| 6,785,813 | B1 | 8/2004 | Vanstone et al. |
| 7,047,408 | B1 | 5/2006 | Boyko et al. |
| 7,076,656 | B2 | 7/2006 | MacKenzie |
| 8,090,947 | B2 | 1/2012 | Vanstone et al. |

FOREIGN PATENT DOCUMENTS

| | | | |
|---|---|---|---|
| EP | 0639907 | A1 | 2/1995 |
| EP | 0661844 | A2 | 7/1995 |
| EP | 0739105 | A1 | 10/1996 |
| EP | 0739106 | A1 | 10/1996 |
| EP | 0977396 | A2 | 2/2000 |
| EP | 1282260 | A1 | 2/2003 |
| JP | 02-301241 | | 12/1990 |
| JP | 2001-313634 | A | 11/2001 |
| JP | 2002-335238 | A | 11/2002 |
| WO | 96/33566 | A1 | 10/1996 |
| WO | 98/18234 | A1 | 4/1998 |
| WO | 99/57844 | A1 | 11/1999 |

OTHER PUBLICATIONS

Menezes, A. et al., "Some New Key Agreement Protocols Providing Implicit Authentication", Proceedings of the Second Workshop on Selected Areas in Cryptography, Apr. 24, 1995.

Menezes, A. et al., IEEE P1363 Standard, "Elliptic Curve Systems", (Draft 6) Part 4, Standard for RSA, Diffie-Hellman and Related Public-Key Cryptography, Nov. 6, 1995.

Lydon, M.; Search Report from European Patent Application No. 96105921.9; search completed Jul. 29, 1996.

Boyd, C. et al; "Design and Analysis of Key Exchange Protocols via Secure Channel Identification"; Advances in Cryptology—Asiacrypt '94, Proceedings of $4^{th}$ International Conference on the Theory and Applications of Cryptology, Wollongong, Australia; Nov. 28 to Dec. 1, 1994; pp. 171 to 181; Springer-Verlag, Berlin.

Schneier, B.; Applied Cryptography; $2^{nd}$ ed.; 1996; pp. 496, 498, 513 to 522; John Wiley & Sons.

Matsumoto, T. et al.; "On Seeking Smart Public-Key-Distribution Systems"; Trans. IECE of Japan, vol. E69, No. 2; Feb. 1996; pp. 99-106.

Diffie, W. et al.; "Authentication and Authenticated Key Exchanges"; Designs, Codes and Cryptography; vol. 2, No. 2; Jun. 1992; pp. 107-125.

Horster, P. et al.; "Meta-Message Recovery and Meta-Blind Signature Schemes Based on the Discrete Logarithm Problem and Their Applications"; Advances in Cryptology—Asiacrypt '94, Proceedings of $4^{th}$ International Conference on the Theory and Applications of Cryptology, Wollongong, Australia; Nov. 28 to Dec. 1, 1994; pp. 224-237; Springer-Verlag, Berlin.

Horster, P. et al.; "Meta-ElGamal signature schemes"; $2^{nd}$ Association of Computing Machinery Computer and Communications Security Conference; May 31, 1994; pp. 96-107; ACM Press, Fairfax.

Nyberg, K. et al.; "Message Recovery for Signature Schemes Based on the Discrete Logarithm Problem"; Advances in Cryptology—Eurocrypt '94; pp. 182-193; Springer-Verlag, Berlin.

Krawczyk, H.; "Skeme: A Versatile Secure Key Exchange Mechanism for Internet"; Proceedings of SNDSS '96, San Diego; Feb. 22 to 23, 1996; pp. 114-127.

Menezes, A. et al.; Handbook of Applied Cryptography; 1997; pp. 402, 451 to 462, 499, 506 to 515; CRC Press, Boca Raton, Florida.

Menezes, A. et al.; "Some New Key Agreement Protocols Providing Implicit Authentication"; Proceedings of the Second Workshop on Selected Areas in Cryptography; May 17, 1995.

Agnew, G. et al.; "Improved Digital Signature Scheme"; Electronics Letters; vol. 26, No. 14; 1990; p. 1024 to 1025.

Carnerero Alvaro, F.; Search Report from PCT Application No. PCT/CA03/00317; search completed Jul. 15, 2003.

Raposo Pires, J.; Search Report from PCT Application No. PCT/CA2004/00727; search completed Jan. 10, 2005.

KEY AGREEMENT AND TRANSPORT PROTOCOL

CROSS-REFERENCE TO RELATED APPLICATIONS

The present application is a continuation of U.S. patent application Ser. No. 11/961,779 filed on Dec. 20, 2007, which is a continuation of U.S. patent application Ser. No. 10/440,486 filed on May 16, 2003 which is a continuation-in-part of PCT International Application No. PCT/CA2003/00317 filed on Mar. 7, 2003, and a continuation-in-part of U.S. application Ser. No. 10/092,972 filed on Mar. 8, 2002 issued as U.S. Pat. No. 7,243,232, which is a continuation-in-part of U.S. patent application Ser. No. 08/426,090 filed on Apr. 21, 1995 issued as U.S. Pat. No. 6,487,661, the contents of which are hereby incorporated by reference.

FIELD OF INVENTION

The present invention relates to key agreement protocols for transfer and authentication of encryption keys.

BACKGROUND OF THE INVENTION

To retain privacy during the exchange of information it is well known to encrypt data using a key. The key must be chosen so that the correspondents are able to encrypt and decrypt messages but such that an interceptor cannot determine the contents of the message.

In a secret key cryptographic protocol, the correspondents share a common key that is secret to them. This requires the key to be agreed upon between the correspondents and for provision to be made to maintain the secrecy of the key and provide for change of the key should the underlying security be compromised.

Public key cryptographic protocols were first proposed in 1976 by Diffie-Hellman and utilized a public key made available to all potential correspondents and a private key known only to the intended recipient. The public and private keys are related such that a message encrypted with the public key of a recipient can be readily decrypted with the private key but the private key cannot be derived from the knowledge of the plaintext, ciphertext and public key.

Key establishment is the process by which two (or more) parties establish a shared secret key, called the session key. The session key is subsequently used to achieve some cryptographic goal, such as privacy. There are two kinds of key agreement protocol; key transport protocols in which a key is created by one party and securely transmitted to the second party; and key agreement protocols, in which both parties contribute information which jointly establish the shared secret key. The number of message exchanges required between the parties is called the number of passes. A key establishment protocol is said to provide implicit key authentication (or simply key authentication) if one party is assured that no other party aside from a specially identified second party may learn the value of the session key. The property of implicit key authentication does not necessarily mean that the second party actually possesses the session key. A key establishment protocol is said to provide key confirmation if one party is assured that a specially identified second party actually has possession of a particular session key. If the authentication is provided to both parties involved in the protocol, then the key authentication is said to be mutual if provided to only one party, the authentication is said to be unilateral.

There are various prior proposals which claim to provide implicit key authentication.

Examples include the Nyberg-Rueppel one-pass protocol and the Matsumoto-Takashima-Imai (MTI) and the Goss and Yacobi two-pass protocols for key agreement.

The prior proposals ensure that transmissions between correspondents to establish a common key are secure and that an interloper cannot retrieve the session key and decrypt the ciphertext. In this way security for sensitive transactions such as transfer of funds is provided.

For example, the MTI/A0 key agreement protocol establishes a shared secret K, known to the two correspondents, in the following manner:—

1. During initial, one-time setup, key generation and publication is undertaken by selecting and publishing an appropriate system prime p and generator $a \epsilon Z^*_p$ in a manner guaranteeing authenticity. Correspondent A selects as a long-term private key a random integer "a", $1 \leq a \leq p-2$, and computes a long-term public key $z_A = \alpha^a \mod p$. B generates analogous keys b, $z_B$. A and B have access to authenticated copies of each other's long-term public key.

2. The protocol requires the exchange of the following messages.

$$A \rightarrow B: \alpha^x \mod p \quad (1)$$

$$A \leftarrow B: \alpha^y \mod p \quad (2)$$

The values of x and y remain secure during such transmissions as it is impractical to determine the exponent even when the value of $\alpha$ and the exponentiation is known provided of course that p is chosen sufficiently large.

3. To implement the protocol the following steps are performed each time a shared key is required.

(a) A chooses a random integer x, $1 \leq x \leq p-2$ and sends B message (1) i.e. $\alpha^x \mod p$.
(b) B chooses a random integer y, $1 \leq y \leq p-2$, and sends A message (2) i.e. $\alpha^y \mod p$.
(c) A computes the key $K=(\alpha^y)^a z_B^x \mod p$.
(d) B computes the key $K=(\alpha^x)^b z_A^y \mod p$.
(e) Both share the key $K=\alpha^{bx+ay}$.

In order to compute the key K, A must use his secret key a and the random integer x, both of which are known only to him. Similarly B must use her secret key b and random integer y to compute the session key K. Provided the secret keys a, b remain uncompromised, an interloper cannot generate a session key identical to the other correspondent. Accordingly, any ciphertext will not be decipherable by both correspondents.

As such this and related protocols have been considered satisfactory for key establishment and resistant to conventional eavesdropping or man-in-the-middle attacks.

In some circumstances it may be advantageous for an adversary to mislead one correspondent as to the true identity of the other correspondent.

In such an attack an active adversary or interloper E modifies messages exchanged between A and B, with the result that B believes that he shares a key K with E while A believes that she shares the same key K with B. Even though E does not learn the value of K the misinformation as to the identity of the correspondents may be useful.

A practical scenario where such an attack may be launched successfully is the following. Suppose that B is a bank branch and A is an account holder. Certificates are issued by the bank headquarters and within the certificate is the account information of the holder. Suppose that the protocol for electronic deposit of funds is to exchange a key with a bank branch via a mutually authenticated key agreement. Once B has authenticated the transmitting entity, encrypted funds are deposited to the account number in the certificate. If no further authentication is done in the encrypted deposit message (which might be the case to save bandwidth) then the deposit will be made to E's account.

It is therefore an object of the present invention to provide a protocol in which the above disadvantages are obviated or mitigated.

SUMMARY OF THE INVENTION

Accordingly, in one aspect, there is provided a method of a first correspondent authenticating a second correspondent in a data communication system, the method comprising the steps of: a) the first correspondent generating a first value $G_A$, and sending the first value to the second correspondent; b) the first correspondent obtaining a shared key K; c) the first correspondent receiving from the second correspondent: i) a first keyed hash of the first value, a second value $G_B$ generated by the second correspondent, and identification information of the first correspondent using the shared key K; ii) the identification information; and iii) the second value; d) the first correspondent computing a first verification keyed hash of the first and second values and the identification information of the first correspondent using the shared key K; and e) the first correspondent verifying that the first keyed hash is equal to the first verification keyed hash.

In another aspect, there is provided a method of authenticated key agreement between a first and second correspondent in a data communication system, each of the correspondents having a public and private key pair in a public key encryption system, the method comprising the steps of: a) the first correspondent generating a first value $G_A$, and sending the first value to the second correspondent; b) the first correspondent computing a shared key K from public information of the second correspondent and information that is private thereto c) the first correspondent receiving from the second correspondent: i) a first keyed hash of the first value, a second value $G_B$ generated by the second correspondent, and identification information of the first correspondent using the shared key K; ii) the identification information; and iii) the second value; d) the first correspondent computing a first verification keyed hash of the first and second values and the identification information of the first correspondent using the shared key K; and c) the first correspondent verifying that the first keyed hash is equal to the first verification keyed hash.

In yet another aspect, a correspondent comprising a cryptographic unit and a computer readable medium having computer executable instructions thereon is provided for causing the correspondent to perform the above methods.

In yet another aspect, a data communication system is provided comprising: a first correspondent comprising a first cryptographic unit for performing cryptographic operations; and a first computer readable medium having computer readable instructions thereon for: a) enabling the first correspondent to generate a first value and send the first value to a second correspondent; b) enabling the first correspondent to obtain a shared key; c) enabling the first correspondent to receive from the second correspondent: i) a first keyed hash of the first value, a second value generated by the second correspondent, and identification information of the first correspondent using the shared key; ii) the identification information of the first correspondent; and iii) the second value; d) causing the first cryptographic unit to compute a first verification keyed hash of the first and second values and the identification information of the first correspondent using the shared key; e) causing the first correspondent to verify that the first keyed hash is equal to the first verification keyed hash; B causing the first cryptographic unit to compute a second keyed hash of the first and second values and identification information of the second correspondent; and g) causing the first correspondent to send the second keyed hash and the identification information of the second correspondent to the second correspondent; and a second correspondent comprising a second cryptographic unit for performing cryptographic operations; and a second computer readable medium having computer readable instructions thereon for: h) causing the second correspondent to compute a second verification keyed hash of the first and second values and identification information of the second correspondent; and i) causing the second correspondent to verify that the second verification keyed hash is equal to the second keyed hash.

BRIEF DESCRIPTION OF THE DRAWINGS

Embodiments of the invention will now be described by way of example only with reference to the accompanying drawings in which.

DETAILED DESCRIPTION OF THE DRAWINGS

Figure 1:
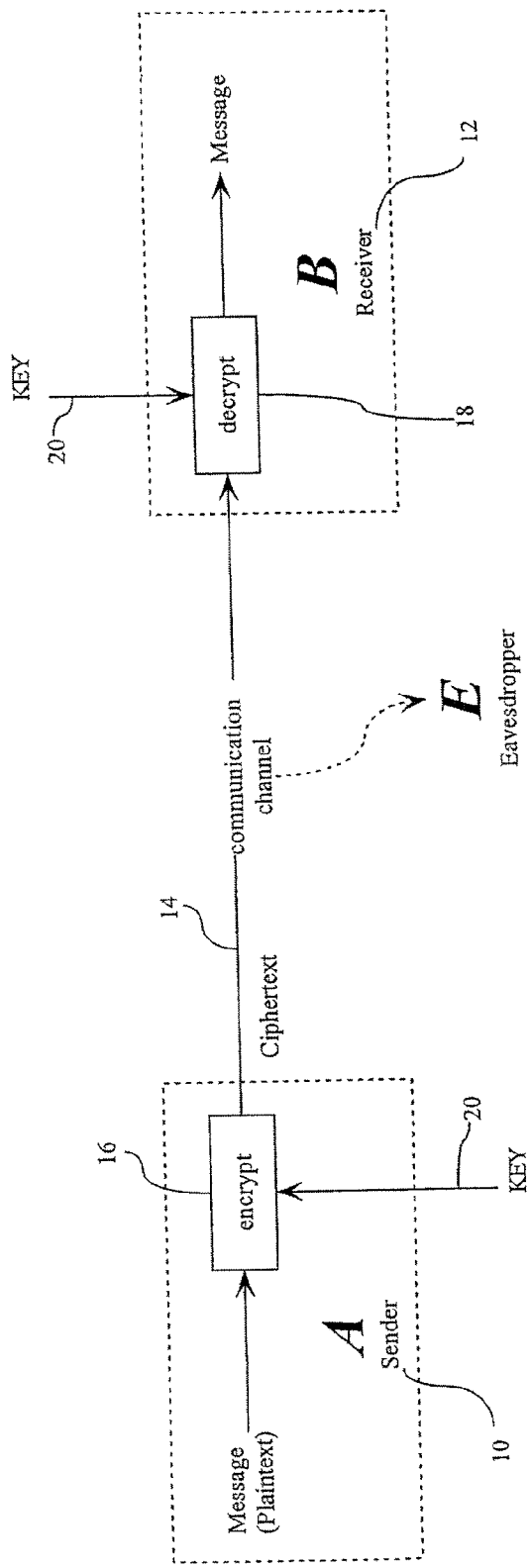
FIG. 1 is a schematic representation of a data communication system.

Referring therefore to FIG. 1, a pair of correspondents, 10,12, denotes as correspondent A and correspondent B, exchange information over a communication channel 14. A cryptographic unit 16,18 is interposed between each of the correspondents 10,12 and the channel 14. A key 20 is associated with each of the cryptographic units 16,18 to convert plaintext carried between each unit 16,18 and its respective correspondent 10,12 into ciphertext carried on the channel 14.

In operation, a message generated by correspondent A, 10, is encrypted by the unit 16 with the key 20 and transmitted as ciphertext over channel 14 to the unit 18.

The key 20 operates upon the ciphertext in the unit 18 to generate a plaintext message for the correspondent B, 12. Provided the keys 20 correspond, the message received by the correspondent 12 will be that sent by the correspondent 10.

In order for the system shown in FIG. 1 to operate it is necessary for the keys 20 to be identical and therefore a key agreement protocol is established that allows the transfer of information in a public manner to establish the identical keys. Implementations are shown schematically in FIGS. 2 through 7.

Figure 2:
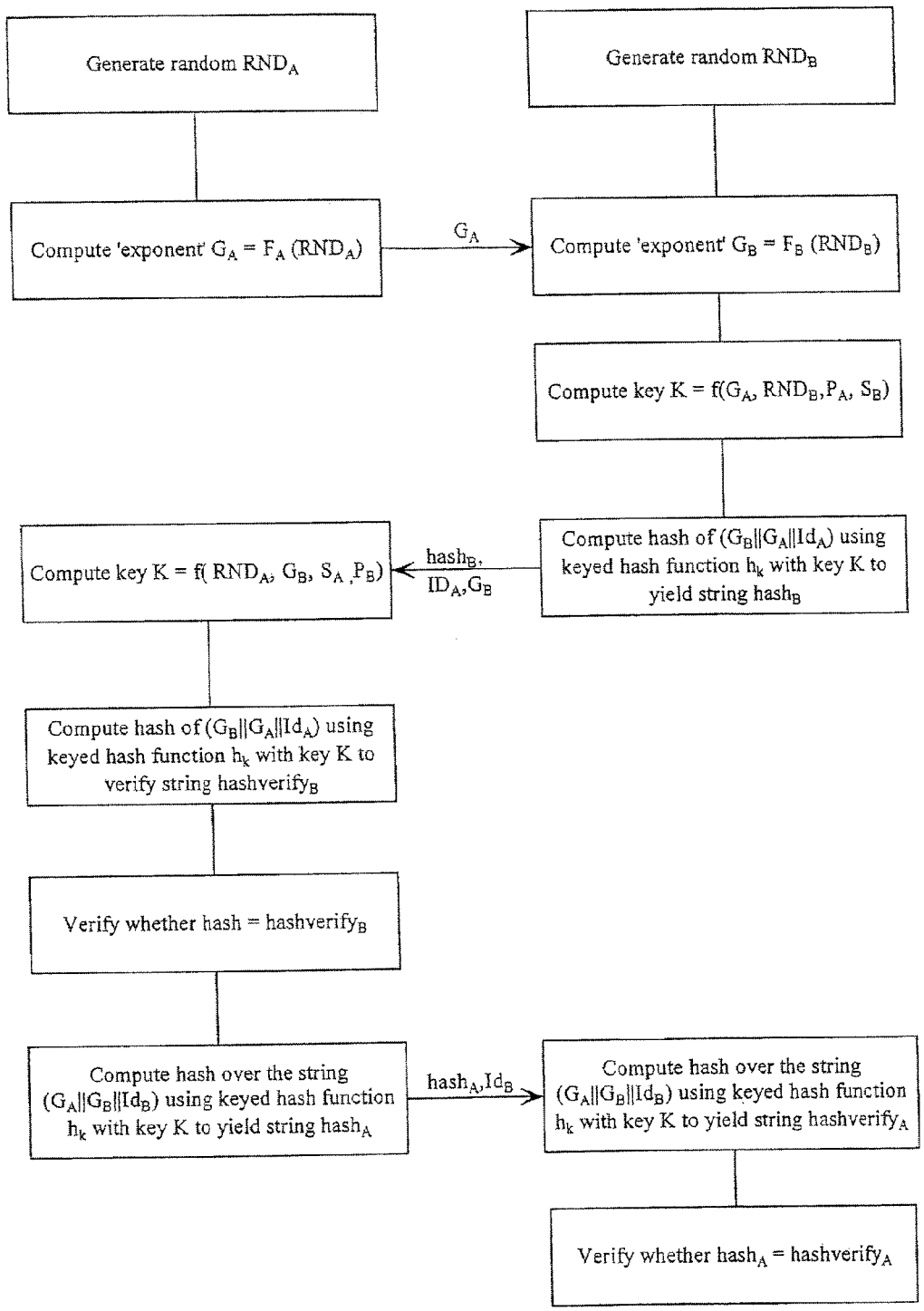
FIGS. 2 through 8 are schematic representations of implementations of different protocols.

Referring to FIG. 2, a mutual public key authenticated key agreement protocol is complemented between a correspondent A shown on the left hand side of the figure and a correspondent B shown on the right hand side. Correspondent A has a public-private key pair $P_A,S_A$ respectively and similarly correspondent B has a public private Key pair $P_B,S_B$.

As a first step, correspondent A generates a session private key as a random number $RND_A$ and computes a corresponding public session key $G_A=F_A(RND_A)$. The function FA is a cryptographic one way function, typically an exponention by the group generator, such as a point multiplication in an elliptic curve cryptosystem.

The public session key $G_A$ is forwarded to correspondent B who generates corresponding parameters of a session private key $RND_B$ and a public session key $G_B$.

The correspondent B computes a session key K as a function of A's public information $G_A,P_A$ AND B's private information $RND_B, S_B$. A corresponding key K' can be computed by A using the private information of A and the public information of B namely $f(RND_A, G_B, S_A, P_B)$.

After correspondent B has generated the key K, he compiles a string $(G_A \| G_B \| Id_A)$ where $Id_A$ is a string that identifies A. The concatenated string is hashed with a cryptographic function $h_k$ which is a keyed hash function that uses the key K to yield a string $hash_B$.

The string $hash_B$ is forwarded to correspondent A together with $Id_A$ and $G_B$.

Upon receipt of the message from B, correspondent A computes the key K's described above. Correspondent A also computes a hash, $hashverify_B$ from the string $(G_A \| G_B \| Id_A)$ using the hash function keyed by the key K'. Correspondent A checks that the hashes verify to confirm the identity of the keys K, K'.

Correspondent A then computes a hash $h_K$, using the key K' on the string $(G_A \| G_B \| Id_A)$ and forwards that together with $Id_B$ of correspondent B. Correspondent B similarly computes a $hashverify_A$ using the keyed hash function hK using the key K on the same string and verifies that $hash_A = hashverify_A$.

Figure 3:
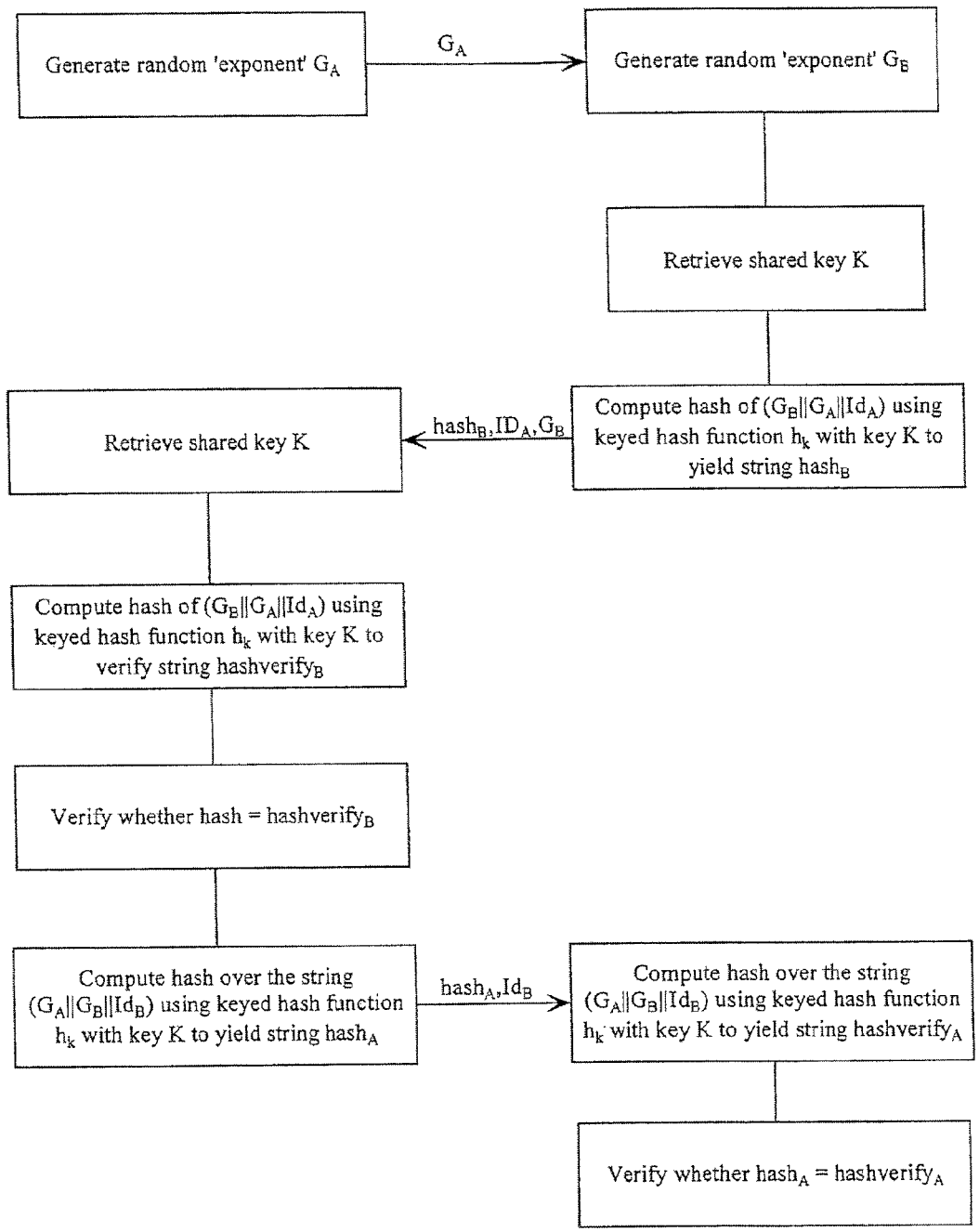

A similar protocol is shown in FIG. 3 to implement a mutual entity authentication protocol. In this protocol the correspondents share a key K obtained over a secure channel. The correspondents A.B, each generate a random integer which is used as the session public key of A and B respectively. Thereafter the exchange of information and verification proceeds as above with respect to FIG. 2 with the shared secret key being utilised in the keyed hash functions.

Figure 4:
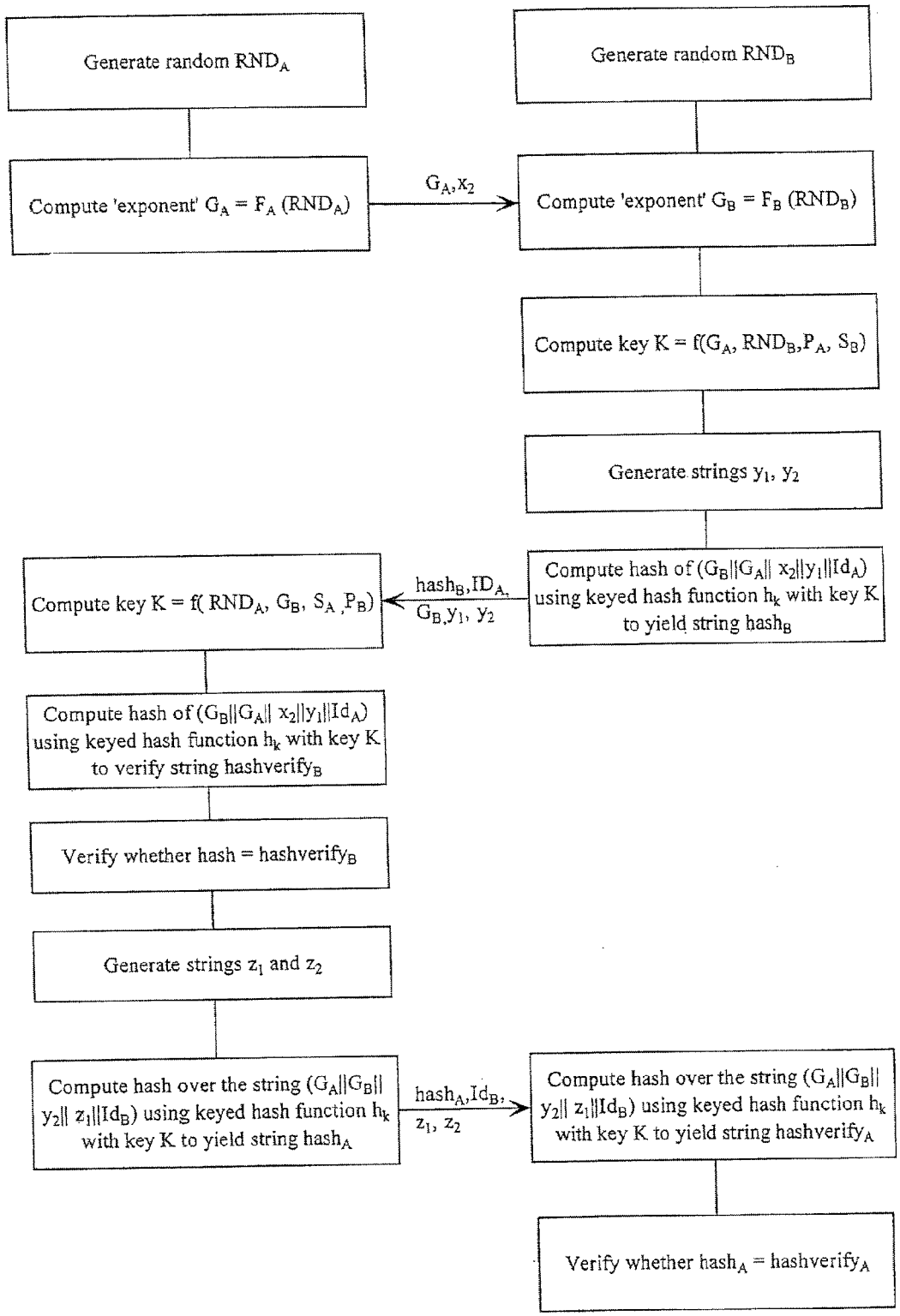

A full mutual public key authenticated key exchange protocol is shown in FIG. 4. An initial exchange of the public keys $P_A, P_B$ is performed over an authenticated channel followed by the exchange of information as shown in the protocol of FIG. 4. In this case the correspondent A sends $G_A$ computed as described above with respect to FIG. 2, together with a string $x_2$ that A wants confirmation of receipt by B. Correspondent B computes the key K as in FIG. 2 and also generates a pair of strings $y_1, y_2$ which B wants to have authenticated by A and receipt confirmed by A respectively. The strings are sent to A with the hash $hash_B$ and identity $Id_A$. The hash $hash_B$ is performed on a string including the message $x_2$ and the string $y_1$ to be authenticated.

Correspondent A computes the key K and verifies the has as before. This also confirms receipt of $x_2$ by B.

Correspondent A in turn generates strings $z_1, z_2$ where $z_1$ is a string that A wants authenticated by B and $z_2$ is a string that may be used in a subsequent execution of the protocol described below. The strings, $z_1$ and $y_2$ together with the identifying information of B, $Id_B$, are included in the string that is hashed with the key K to provide the string $hash_A$. This sent together with the identity of B and the strings $z_1, z_2$ to the correspondent B who can verify the hashes as before, thereby confirming receipt of $y_2$ and authentication of $z_1$ by the correspondent A.

Thus information is exchanged in an authenticated manner and a common key obtained that allows subsequent exchange of correspondence on a secure channel.

With the protocol described in FIG. 4 it is possible to implement a mutual public key authenticated key agreement protocol by letting the strings $x_2, y_1, y_2, z_1, z_2$ all be empty strings. Alternatively, a mutual public key authenticated key agreement protocol with implicit key agreement can be implemented by using x2 as a string that is assumed to represent $E_K(k)$, the result of applying an encryption function E with key K on the value of k. Correspondent B can compute the value of K and hence retrieve the notional value of k from the string. He can use this as his shared session key with the correspondent A. The value of y1 may be used to represent $E_K(k_{21})$ and $z_1$ as $E_K(k_{12})$ where $k_{21}$ and $k_{12}$ are different keys for communication or other secret information to be shared between the correspondents. In this case $y_2$ and $z_2$ are empty strings. In this way there is a key agreement on a shared key $K_{AB}$ together with authenticated key transport of the keys $k_{21}$ and $k_{12}$ between the correspondents and authenticated key agreement on k. Moreover, if additional information is provided in the strings $x_2$ and $y_2$ then confirmation of proper receipt is also obtained.

Figure 5:
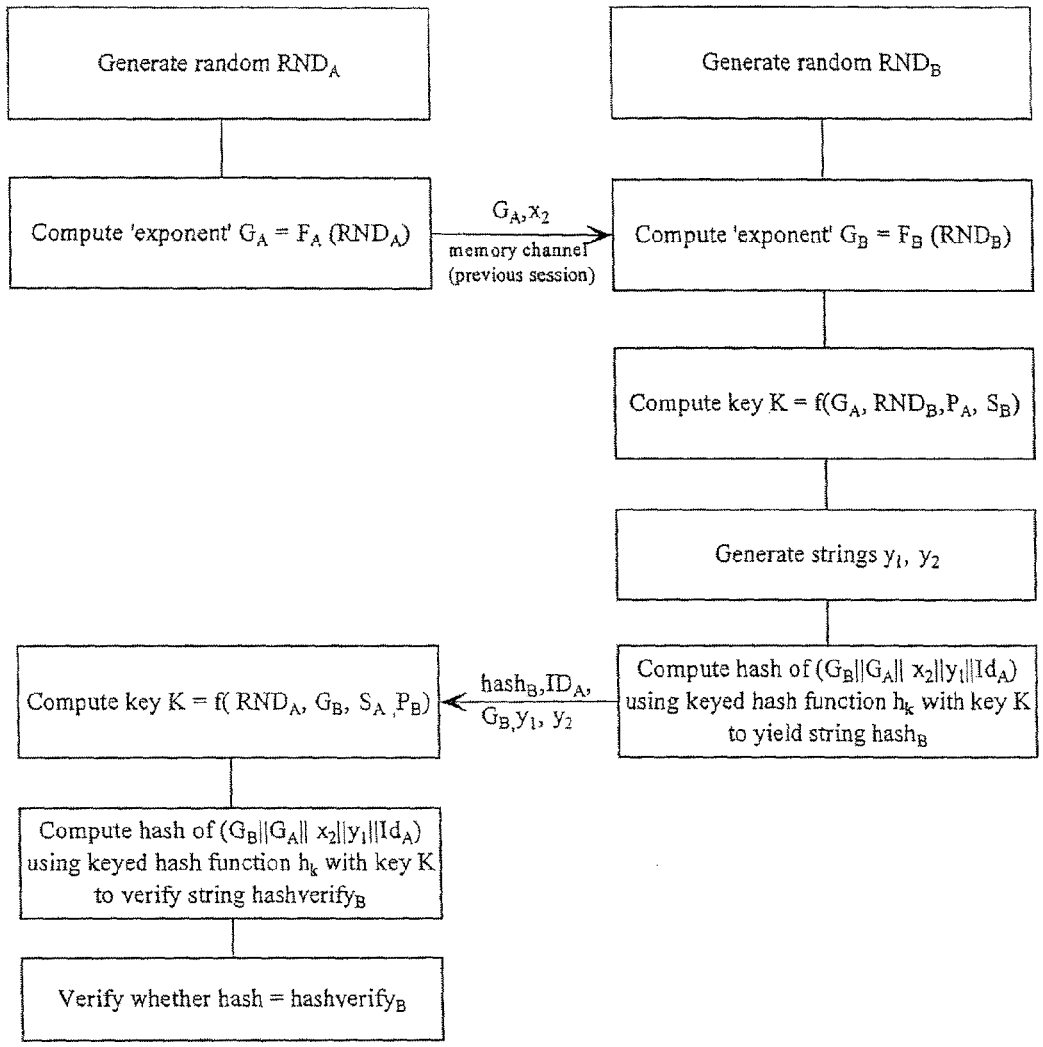

The protocol of FIG. 4 may also be used to increase efficiency in successive sessions by using the string $z_2$ to pass the information exchanged in the first pass of the next session. Thus as shown in FIG. 5, the string $G_A, x_2$ is sent as $z_2$ in the previous session. The protocol then proceeds from correspondent B as before. As seen in FIG. 5, the third transmission may be optionally omitted. Correspondent B may also take advantage of this facility by including the information $G_B, y_1$ for the next session in the exchange as $y_2$.

Figure 6:
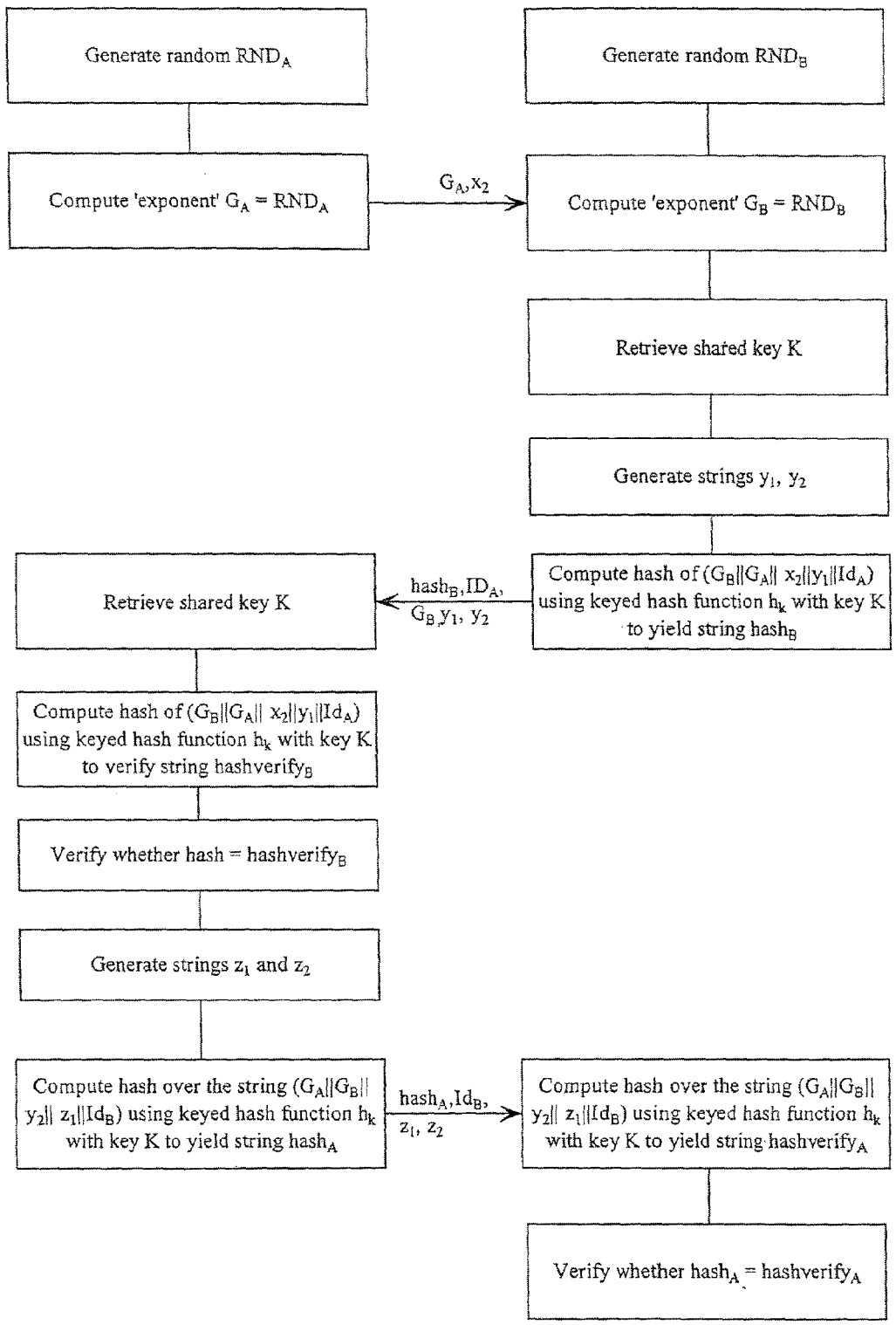

The mutual public key authenticated key agreement protocol may also be adapted for entity authentication implementations as shown in FIG. 6. In this case, as in FIG. 3 above, the key generation is omitted as the correspondents have a shared key obtained over a secure channel.

Figure 7:
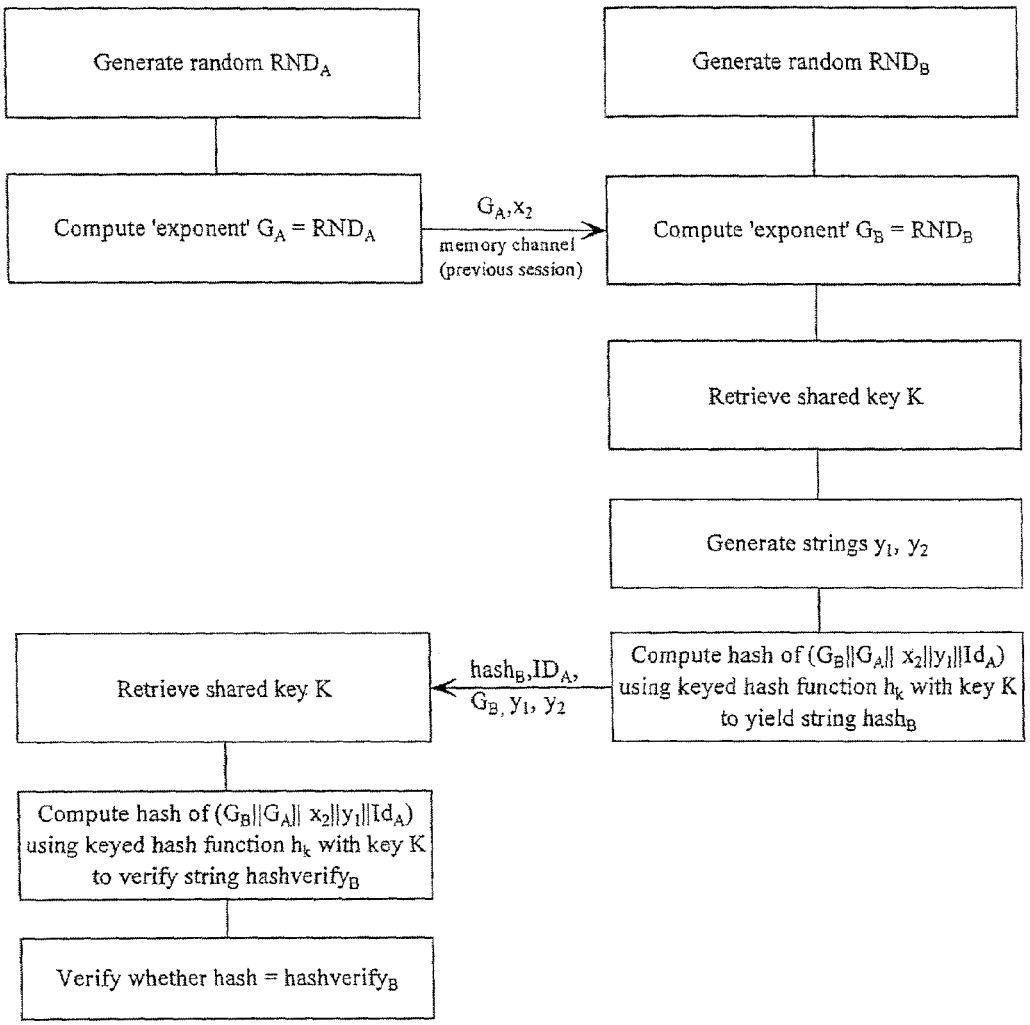

Similarly, the protocol of FIG. 6 may be modified as illustrated in FIG. 7 to take advantage of the exchange of information in a previous session, similar to that of FIG. 5.

It will be seen therefore that a number of versatile and flexible protocols can be developed from the general protocol to meet particular needs. These protocols may implement elliptic curve cryptography or operate in $Z_p$ as preferred.

It can be readily seen that the message flows of the public-key authenticated key agreement protocol depicted in FIG. 3 and those of the entity authentication protocol depicted in FIG. 2 have identical structure. Moreover, the computation of the hash values hashA and hashB by correspondent A and B respectively, as well as the verification thereof, take strings with an identical structure as input. In fact, both protocols only differ in the way the key K used in the protocol is derived. Thus, a combined implementation of both protocols may take advantage of a common handling of telecommunication flows, including messaging, error handling and the-like, and may take advantage of a common handling of the key confirmation steps (i.e., generation and processing of hash values).

A similar reasoning holds for the message flows and processing steps of the public-key authenticated key agreement protocol depicted in FIG. 4 and the version thereof depicted in FIG. 5. It will be appreciated that the latter consists of executing only part of the former. A similar remark holds for the entity authentication protocol depicted in FIG. 6 and the one depicted in FIG. 7. It should also be noted that the augmented public-key authenticated key agreement protocol depicted in FIG. 4 can be used to implement the one depicted in FIG. 3 and that, similarly, the augmented entity authentication protocol depicted in FIG. 6 can be used to implement the one depicted in FIG. 2. Thus, all the protocols described can be implemented with largely common routines to handle telecommunication and message flows and with a large degree of commonality of the implementation of the protocol steps of each and every one of the protocols.

It will be appreciated that although the invention has been described with reference public key based agreement protocols and entity authentication protocols, it may equally be utilized on symmetric key agreement protocols. In such an embodiment, the computation of the shared key K may be performed using a master key $K_m$ as one input to a keyed hash function. A concatenation of the ephemeral keys $G_A$, $G_B$, is used as the other input and the resultant output is used as the shared key K.

Figure 8:
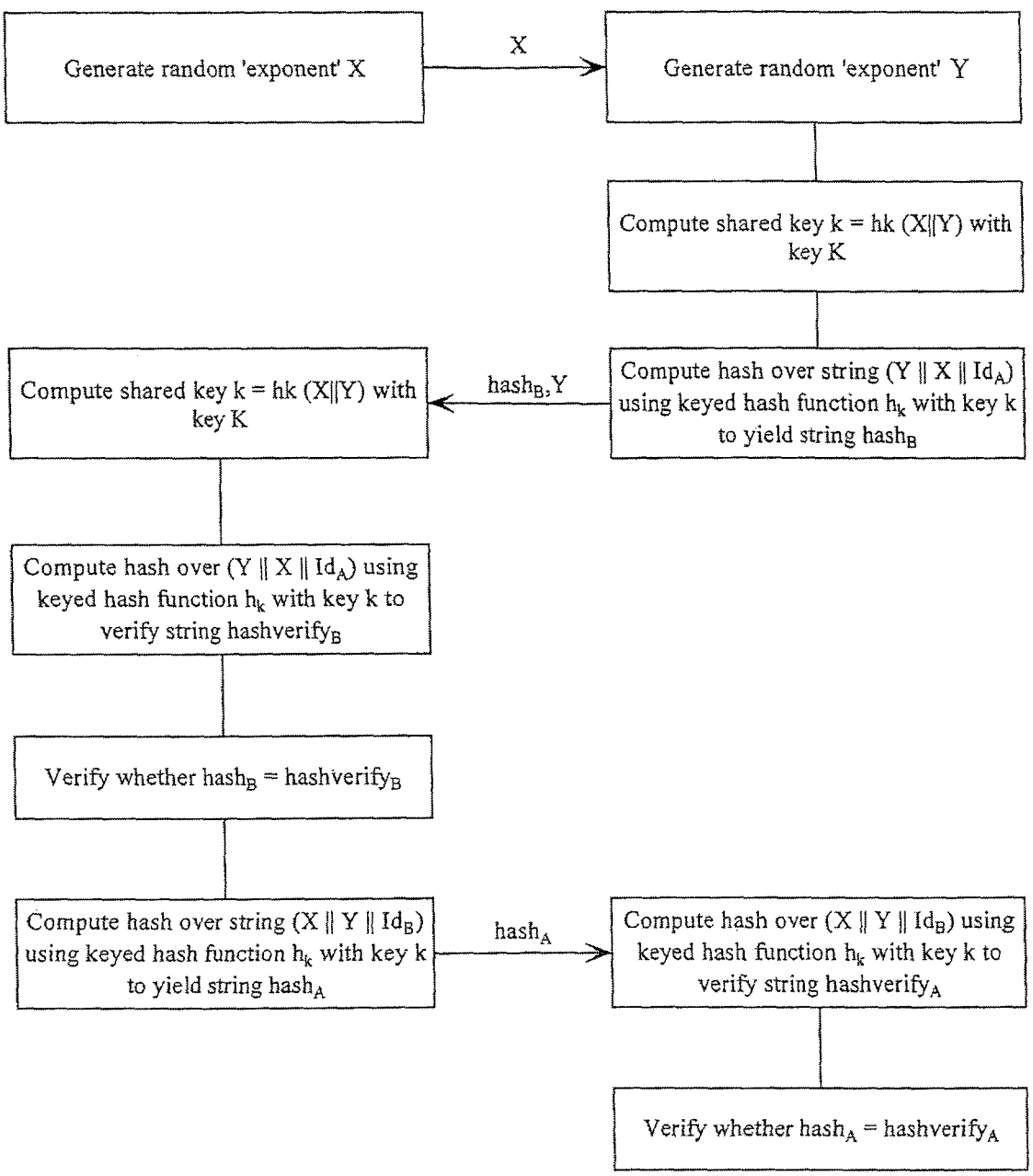

Such an arrangement is shown in FIG. 8.

I claim:

1. A method of authenticated key exchange in a data communication system, said method comprising:

a first communication device generating a first public value $G_A$ for use as a session public key and sending to a second communication device said first public value $G_A$;

said second communication device generating a second public value $G_B$ for use as another session public key, obtaining a shared key K and computing a first keyed hash of said first public value $G_A$, said second public value $G_B$ and identification information of one of said first communication device and said second communication device, said first keyed hash using said shared key K;

said second communication device sending said first keyed hash, said second public value $G_B$ and said identification information of one of said first communication device and said second communication device to said first communication device;

said first communication device obtaining said shared key K and computing a first verification keyed hash of said first public value $G_A$, said second public value $G_B$ and said identification information of one of said first communication device and said second communication device, said first verification keyed hash using said shared key K; and said first communication device verifying that said first keyed hash equals said first verification keyed hash.

2. The method according to claim 1, further comprising:

said first communication device computing a second keyed hash of said first public value $G_A$, said second public value $G_B$ and identification information of the other of said first communication device and said second communication device, said second keyed hash using said shared key K, and said first communication device sending to said second communication device said second keyed hash and said identification information of the other of said first communication device and said second communication device;

said second communication device computing a second verification keyed hash of said first public value $G_A$, said second public value $G_B$ and said identification information of the other of said first communication device and said second communication device, said second verification keyed hash using said shared key K; and said second communication device verifying that said second verification keyed hash equals said second keyed hash.

3. The method according to claim 1 wherein said shared key K is obtained by said first communication device by combining information private to said first communication device with public information of said second communication device, and said shared key K is obtained by said second communication device by combining information private to said second communication device with public information of said first communication device.

4. The method according to claim 3 wherein said first communication device computes said shared key K using a random number generated by said first communication device, said second public value $G_B$, a private key $S_A$ of said first communication device, and a public key $P_B$ made public by said second communication device, and wherein said second communication device computes said shared key K using a random number generated by said second communication device, said first public value $G_A$, a private key $S_B$ of said second communication device, and a public key $P_A$ made public by said first communication device.

5. The method according to claim 1 wherein said method is implemented using elliptic curve cryptography.

6. A method of authenticated key exchange in a data communication system, said method comprising:

a first communication device A generating a first public value $G_A$ for use as a session public key and sending to a second communication device B said first value $G_A$;

said first communication device A receiving from said second communication device B a second public value $G_B$ used by said second communication device B as a session public key, identification information of one of said first communication device A and said second communication device B, and a first keyed hash of: said first public value $G_A$, said second public value $G_B$ and said identification information of one of said first communication device A and said second communication device B, said first keyed hash using a shared key K obtained by said second communication device B;

said first communication device A obtaining said shared key K and said first communication device A computing a first verification keyed hash of said first public value $G_A$, said second public value $G_B$ and said identification information of one of said first communication device A and said second communication device B, said first verification keyed hash using said shared key K; and said first communication device A verifying that said first keyed hash equals said first verification keyed hash.

7. The method according to claim 6, further comprising:

said first communication device A computing a second keyed hash of: said first public value $G_A$, said second public value $G_B$ and identification information of the other of said first communication device A and said second communication device B, said second keyed hash using said shared key K, and said first communication device A sending said second keyed hash and said identification information of the other of said first communication device A and said second communication device B to said second communication device B for verification by said second communication device B.

8. The method according to claim 6 wherein said shared key K is obtained by said first communication device A by combining information private to said first communication device A with public information of said second communication device B.

9. The method according to claim 8 wherein said first communication device A computes said shared key K using a random number generated by said first communication device A, said second public value $G_B$, a private key $S_A$ of said first communication device A, and a public key $P_B$ made public by said second communication device.

10. The method according to claim 6 wherein said method is implemented using elliptic curve cryptography.

11. A system comprising a first communication device and a second communication device configured to perform the method of claim 1.

12. A communication device configured to perform the method of claim 6.

13. A non-transitory computer readable medium having stored thereon computer readable instructions for performing the method of claim 1.

14. A non-transitory computer readable medium having stored thereon computer readable instructions for performing the method of claim 6.

\* \* \* \* \*